United States Patent
Ficarra

(10) Patent No.: US 6,775,544 B2
(45) Date of Patent: Aug. 10, 2004

(54) AUTOMATIC DIAGNOSTIC FOR DETECTION OF INTERFERENCE IN WIRELESS COMMUNICATION SYSTEM

(75) Inventor: Louis J. Ficarra, Oakland, NJ (US)

(73) Assignee: AT&T Wireless Services, Inc., Redmond, WA (US)

( * ) Notice: Subject to any disclaimer, the term of this patent is extended or adjusted under 35 U.S.C. 154(b) by 363 days.

(21) Appl. No.: 09/925,605

(22) Filed: Aug. 10, 2001

(65) Prior Publication Data

US 2001/0055952 A1 Dec. 27, 2001

Related U.S. Application Data

(63) Continuation of application No. 09/325,037, filed on Jun. 3, 1999.

(51) Int. Cl.[7] .................................................. H04Q 7/30
(52) U.S. Cl. .................... 455/424; 455/63.1; 455/67.13; 455/561; 455/226.1
(58) Field of Search ................................ 455/423, 424, 455/63.1, 67.11, 67.13, 524, 561, 562.1, 522, 226.1; 375/317

(56) References Cited

U.S. PATENT DOCUMENTS

| | | | |
|---|---|---|---|
| 4,390,838 A | | 6/1983 | Savage ..................... 324/77 E |
| 4,507,740 A | | 3/1985 | Star et al. .................... 364/487 |
| 4,789,948 A | | 12/1988 | von der Embse ........... 364/514 |
| 4,859,933 A | | 8/1989 | Taylor et al. .............. 324/77 B |
| 4,964,065 A | | 10/1990 | Hicks et al. ................. 364/514 |
| 5,065,334 A | | 11/1991 | Taylor et al. ................ 364/485 |
| 5,148,548 A | | 9/1992 | Meche et al. ............... 455/34.1 |
| 5,157,709 A | | 10/1992 | Ohteru ........................ 379/58 |
| 5,179,722 A | | 1/1993 | Gunmar et al. ............. 455/33.1 |
| 5,307,379 A | * | 4/1994 | Bergstrom et al. .......... 375/317 |
| 5,309,503 A | * | 5/1994 | Bruckert et al. .............. 379/60 |
| 5,506,869 A | | 4/1996 | Royer ......................... 375/224 |
| 5,603,093 A | | 2/1997 | Yoshimi et al. ................ 455/63 |
| 5,706,307 A | | 1/1998 | Gaspard ...................... 375/227 |
| 5,732,328 A | * | 3/1998 | Mitra et al. ............. 455/522 X |
| 5,752,190 A | | 5/1998 | Kaewell, Jr. et al. ........ 455/436 |
| 5,799,243 A | * | 8/1998 | Ojaniemi ...................... 455/63 |
| 5,924,023 A | * | 7/1999 | Smith et al. ............. 455/226.3 |
| 6,023,622 A | * | 2/2000 | Plaschke et al. ............ 455/452 |
| 6,421,543 B1 | * | 7/2002 | Molnar ..................... 455/562.1 |
| 6,615,040 B1 | * | 9/2003 | Benveniste ................. 455/423 |

* cited by examiner

Primary Examiner—Nay Maung
Assistant Examiner—Philip J. Sobutka
(74) Attorney, Agent, or Firm—Kenyon & Kenyon

(57) ABSTRACT

In an automated diagnostic method for identifying interference events at a receiver of a wireless communication system, the receiver is queried for energy measurement data. From the energy measurement data, a probability distribution of the energy is calculated. An interference event may be identified if the calculated probability distribution exceeds a predetermined threshold.

23 Claims, 4 Drawing Sheets

AUTOMATIC DIAGNOSTIC FOR DETECTION OF INTERFERENCE IN WIRELESS COMMUNICATION SYSTEM

This application is a continuation of U.S. application Ser. No. 09/325,037 filed Jun. 3, 1999, and claims priority thereto.

BACKGROUND OF THE INVENTION

The present invention relates to an automatic diagnostic application for use in wireless communication systems.

Wireless communication systems are well-known. They typically involve transmission of modulated information signals from a central base station to mobile subscriber terminals and back over wireless channels. Over the years, because of the intense commercial success of such systems, several alternate architectures have been deployed for wireless communication systems. Thus, wireless communication systems may vary by access technique and carrier modulation techniques, among other things. For example, cellular systems have been deployed according to frequency division multiple access, time division multiple access and code division multiple access. Further, these cellular systems have employed both analog modulation techniques, such as frequency modulation, and digital modulation techniques, such a frequency shift keying, amplitude shift keying, phase shift keying or combinations thereof.

The various communication systems, however, share at least one thing in common—when extraneous energy is received by a base station in traffic channels, it interferes with the reception of information signals that are supposed to be received in those channels. Accordingly, to maintain high signal quality in a system, it is desirable to identify and either suppress or avoid strong interference signals in the system.

Interference typically is created from either a 'rogue' interference source or from intra-system interference. A rogue interferer may be a broadcasting agent from another wireless communication system. While different co-located wireless communication systems typically are allocated mutually exclusive segments of radio spectrum, it is not uncommon for equipment malfunction or some high power broadcast event in a first system to generate interference energy in reception channels of a second system. Intra-system interference refers to broadcast energy from a first element in a wireless system that is received inadvertently by a second element of the same system.

Interferers may be transient. A rogue interferer may be active only intermittently, for a short period of time. Thus, while a cell site may experience severe interference effects when the rogue is active, it may not suffer performance degradation continuously. Similarly, intra-system interference may occur randomly for reasons that are well-known. For maintenance personnel of the wireless communications, the random nature of interference may make it very difficult to identify cell sites that are candidates for remediation. To identify cell sites that experience interference, it had been necessary in the past for maintenance personnel to travel to the cell site and perform interference measurements manually. This manual search process increases the time and expense involved in identifying and remediating interference in a wireless system.

Accordingly, there is a need in the art for an automatic diagnostic method for wireless communication systems that identify and report periods of severe interference in the system.

SUMMARY

Embodiments of the present invention provide an automated diagnostic method for identifying interference events at a receiver of a wireless communication system. According to the method, the receiver is queried for energy measurement data. From the energy measurement data, a probability distribution of the energy is calculated. An interference event may be identified at the receiver if the calculated probability distribution for the receiver exceeds an average probability distribution for a larger set of receivers in the system. In an embodiment, the energy measurement data may represent the noise floor at the receiver and, optionally, may include channel quality metrics.

DETAILED DESCRIPTION

The present invention provides an automated diagnostic method for identifying cell site equipment whose quality of service may be degraded due to the presence of strong interference signals in the cell.

Figure 1:
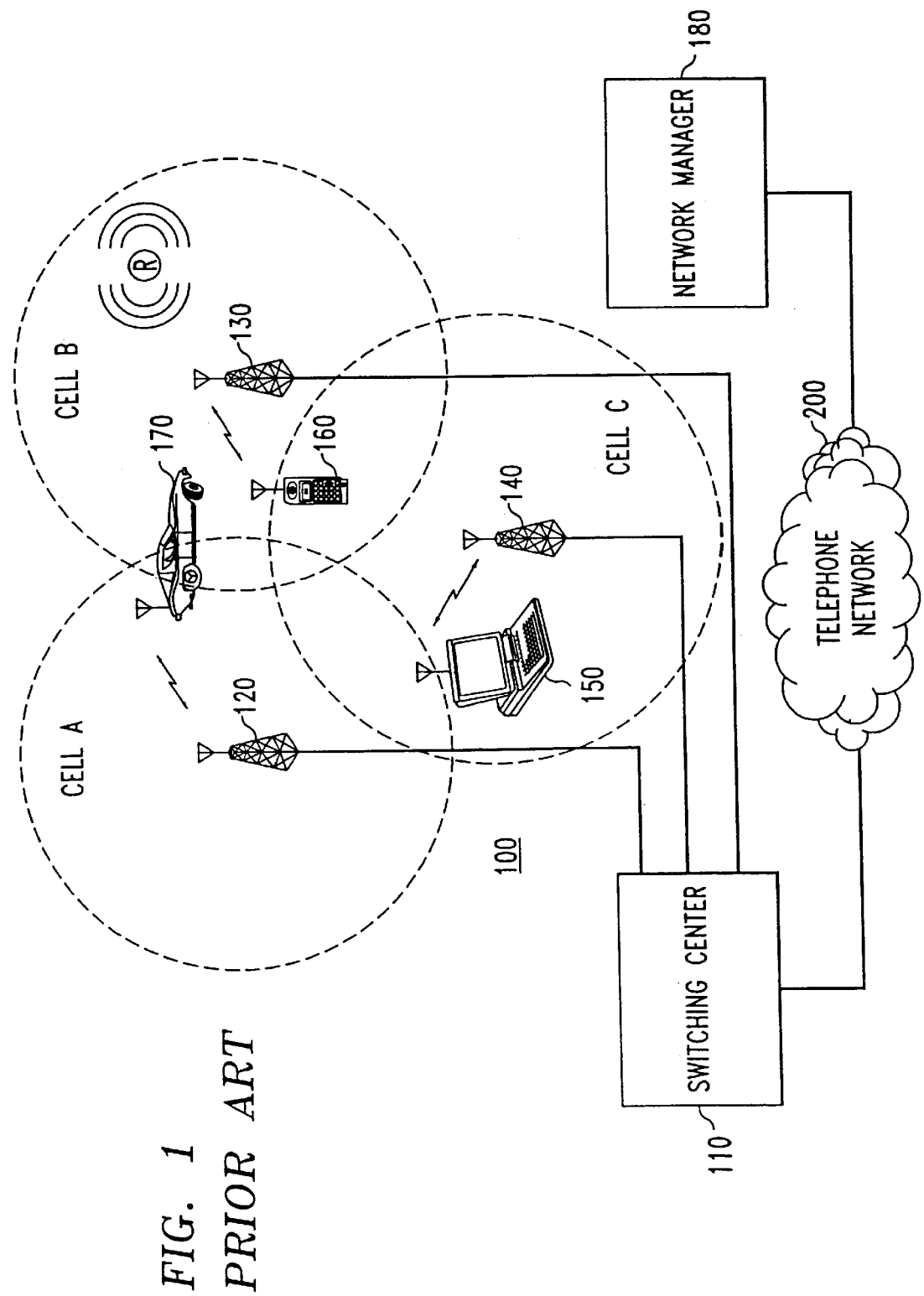
FIG. 1 illustrates a typical architecture of a wireless communication system.

FIG. 1 is a simplified block diagram of a conventional wireless communication system 100. The system 100 may be populated by a switching center 110 and a plurality of base stations 120–140. The system 100 also may include a variety of subscribers 150–170 that communicate with the base stations 120–140 over wireless communication links. FIG. 1 also illustrates a rogue interferer R.

The number and layout of the base stations 120–140 define cells A-C around each base station 120–140. The number and layout of switching centers 110 and base stations 120–140 are governed by conventional design considerations that are beyond the scope of this discussion but typically include the size and geography of the area in which the wireless system is located. Optionally, the system 100 may contain a network manager 180 that may or may not be co-located with the switching center 110. Thus, depending upon the size and configuration of the switching centers 110, the network manager 180 may be provided in direct communication with a switching center 110 or may communicate with the switching center 110 via a telephone network 200.

The switching center 110 may be connected to a telephone network 200, such as the public switched telephone network ("PSTN"), via a wired communication link. The switching center 110 also may be connected to each of the base stations 120–140 via a wired communication link. The switching center 110 may determine the location of a subscriber (say, 170) within the system 100. When the switching center 110 receives data for the subscriber 170, the switching center 110 identifies a base station 120 that may transmit the data to the subscriber 170 and routes the data to the identified base station 120 with sufficient identifying information so that the base station can transmit the data to the subscriber 170. The base station formats the data signal and transmits it to the subscriber 170.

As is known, the base stations 120–140 and the subscribers 150–170 communicate with each other according to a predetermined air interface protocol. Typically, the protocol includes certain techniques that permit a base station (say, 120) to determine a level of interference experienced in the communication link between it and a subscriber (say, 170). Some of the conventionally known wireless communication systems calculate measurements of bit error rate ("BER") which provide insight into the level of interference experienced in a cell site.

Base stations also may possess the ability to measure a noise floor at the base station. For example, the CMS 8800 base station, commercially available from Ericsson Communications Inc., measures the noise floor by sampling idle channels for interference energy on a periodic basis. Because the channel is idle, no subscribers 170 should be transmitting on the channel. All received energy, therefore, should come from rogues or intra-system interference. The CMS 8800 provides a Measurement Characteristic 1 ("MCHA 1") in its Radio Environment Statistics functionality to store the samples of measured interference energy. Base stations from other vendors also may include this functionality. For example, the Autoplex cellular switch, commercially available from Lucent Technologies of Murray Hill, N.J., stores data for noise floor measurements.

Figure 2:
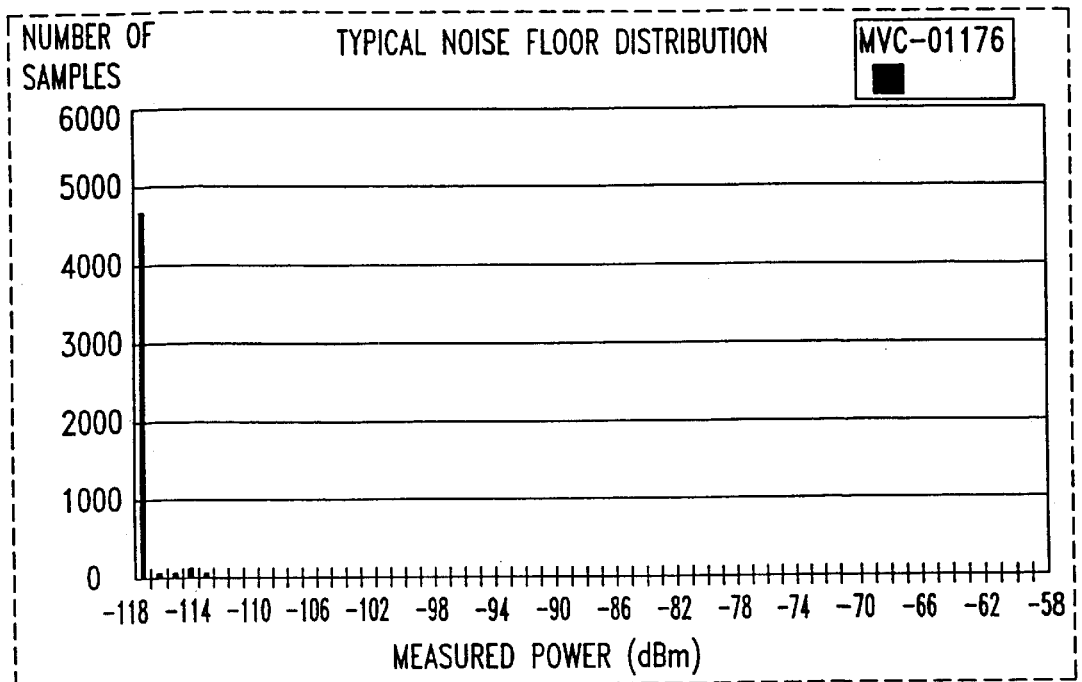
FIG. 2 is a bar graph illustrating exemplary interference measurements from a first cell site.
Figure 3:
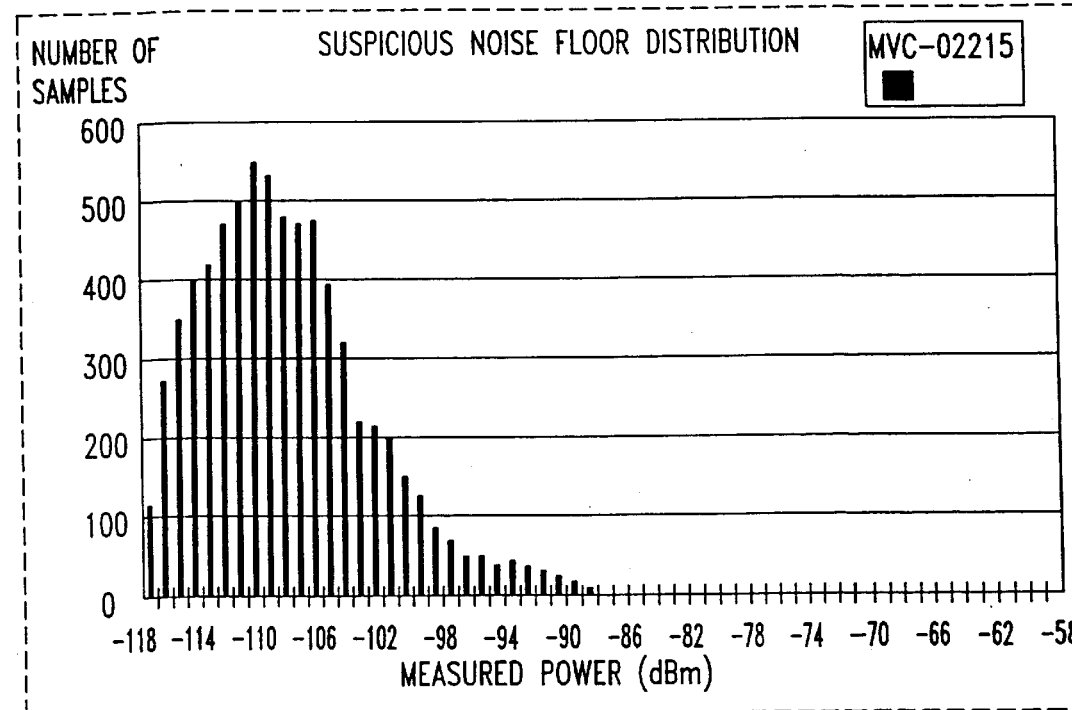
FIG. 3 is a bar graph illustrating exemplary interference measurements from a second cell site.

FIG. 2 is a bar graph illustrating an example of interference measurements made in a cell site when rogue interferers and intra-system interference are absent. As is shown in the graph, the cell site measured almost 5,000 samples at −118 dB. In this example, the average measured power at the cell cite was −117.8 dBm. FIG. 3 is a bar graph illustrating an example of interference measurements made in a cell site that experiences interference from a rogue interferer. In this example, the average measured power was −109.0 dBm.

Experience with power measurements made at cell sites shows that, when a cell site experiences either rogue or intra-system interference, the counted samples of measured interference at that cell site are more widely dispersed than counted samples of measured interference at cell sites that do not experience interference. For example, in a cell site having a rogue interferer, interference that is strong enough to overload a receiver's amplifier(s) may be characterized by a standard deviation that is larger than the standard deviation of "normal" cell sites, those that do not experience rogue interference. An algorithm may exploit these differences to identify cell sites with interference.

Figure 4:
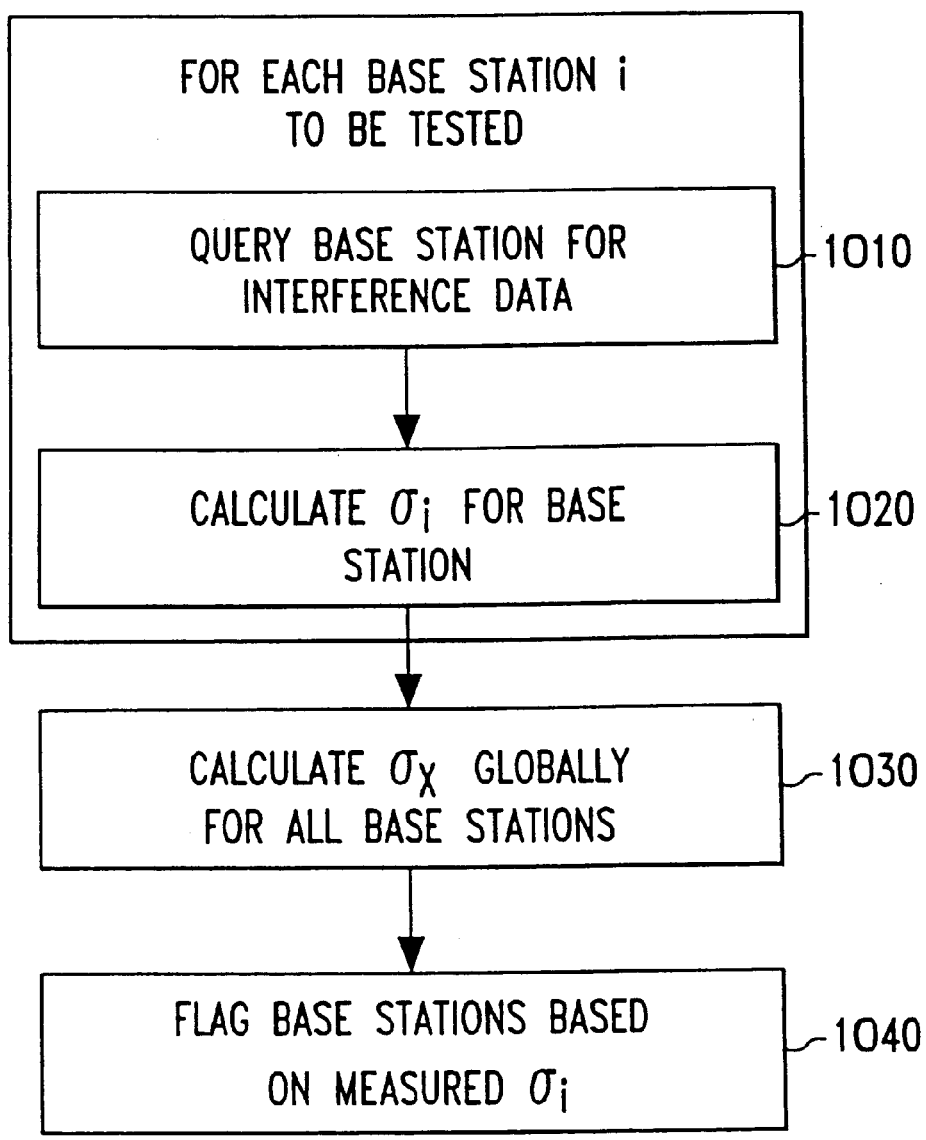
FIG. 4 illustrates a method of the present invention according to an embodiment.

FIG. 4 illustrates a method 1000 according to an embodiment of the present invention. The method 1000 may be applied to test every base station 120–140 in a system 100 or may be limited to test a selected sub-set of the base stations, according to the discretion of those who would use the method 1000. The method 1000 queries each base station 120–140 for the counted samples of measured interference (Step 1010). From a response, the method 1000 calculates a probability distribution of the interference at the cell site ($\sigma_i$) (Step 1020) according to:

$$\sigma_i = \sqrt{\frac{\sum (x_j - E(X_i))^2}{N}} \quad (1)$$

where E(X) is the expected value of X, $X_j$ is the power level measured at the $j^{th}$ sample and N is the total number of samples made. Steps 1010–1020 may be repeated for all base stations subject to test.

Once reports are received from all of the base stations, the method 1000 calculates a $\sigma$ for the entire set of base stations under test (labeled $\sigma_x$) (Step 1030). The method 1000 may mark a base station as suffering interference if its $\sigma_i$ is significantly greater than statistical norms (Step 1040). In one embodiment, the method 1000 may mark a base station i as suffering interference if its $\sigma_i$ is greater than E(x)+$\sigma_x$. In another embodiment, the method 1000 may mark a base station as suffering interference in its $\sigma_j$ is greater than some predetermined threshold.

Optionally, according to another embodiment of the present invention, the method 1000 may include channel quality metrics as an indicator of interference. For example, in its MCHA 1, the CMS 8800 base station stores data samples representing a ratio of carrier to interference (C/I) energy measured in active analog channels. In its MCHA 26, the CMS 8800 base station stores data samples representing bit error rates ("BER") measured in active digital channels. Both measurements, C/I and BER, provide insight to the interference that may be occurring at a cell site.

Processing of channel quality metrics may be integrated into the method 1000 by adding the following steps. In this embodiment, at step 1010, the method 1000 may query a cell site for data representing the channel quality metrics. At step 1020, from the channel quality data the method 1000 also calculates a distribution of the channel quality data ($\eta_i$). At step 1030, the method 1000 also calculates $\eta$ for the entire set base stations subject to test (labeled $\eta_x$). The method 1000 may mark a base station as suffering interference based on its $\eta_i$.

According to this embodiment of the present invention, a base station may be marked as suffering interference by comparing its rig against the global value $\eta_x$. for example, if $\eta_i > \eta_x + \sigma_\eta$ where $\sigma_\eta$ is the standard deviation of $\eta_x$. Alternatively, a base station may be marked as interfered if its $\eta_i$ is greater than a predetermined absolute threshold. And, of course, a base station may be marked based upon a combination of $\sigma_i$ and $\eta_i$ (e.g., if $\sigma_i > E(x) + \sigma_x$ and $\eta_i > E(\eta_x) + \sigma_\eta$.

At the discretion of those who would use the method 1000, the method 1000 may be performed by either a switching center 110 or a network manager 180 to test base stations 120–140 within the communication system 100. Typically, a communication system 100 will provide administrative and diagnostic functionality on predetermined platforms within a wireless system 100. The method 1000 may be adapted to run on such platforms.

As will be appreciated by those familiar with the Ericsson CMS 8800 products, the measurement characteristics MCHA 1 and MCHA 7 are suited for use by the algorithm when the CMS 8800 base studio is operating in analog mode. When the CMS 8800 is operating in digital mode, the method may query the base station's MCHA 21 and MCHA 26 measurement characteristics. The MCHA 21 stores a representation of the digital noise floor at the base station. The MCHA 26 stores a representation of the digital uplink bit error rate. Again, digital products from other vendors may store similar information in different ways.

Figure 5:
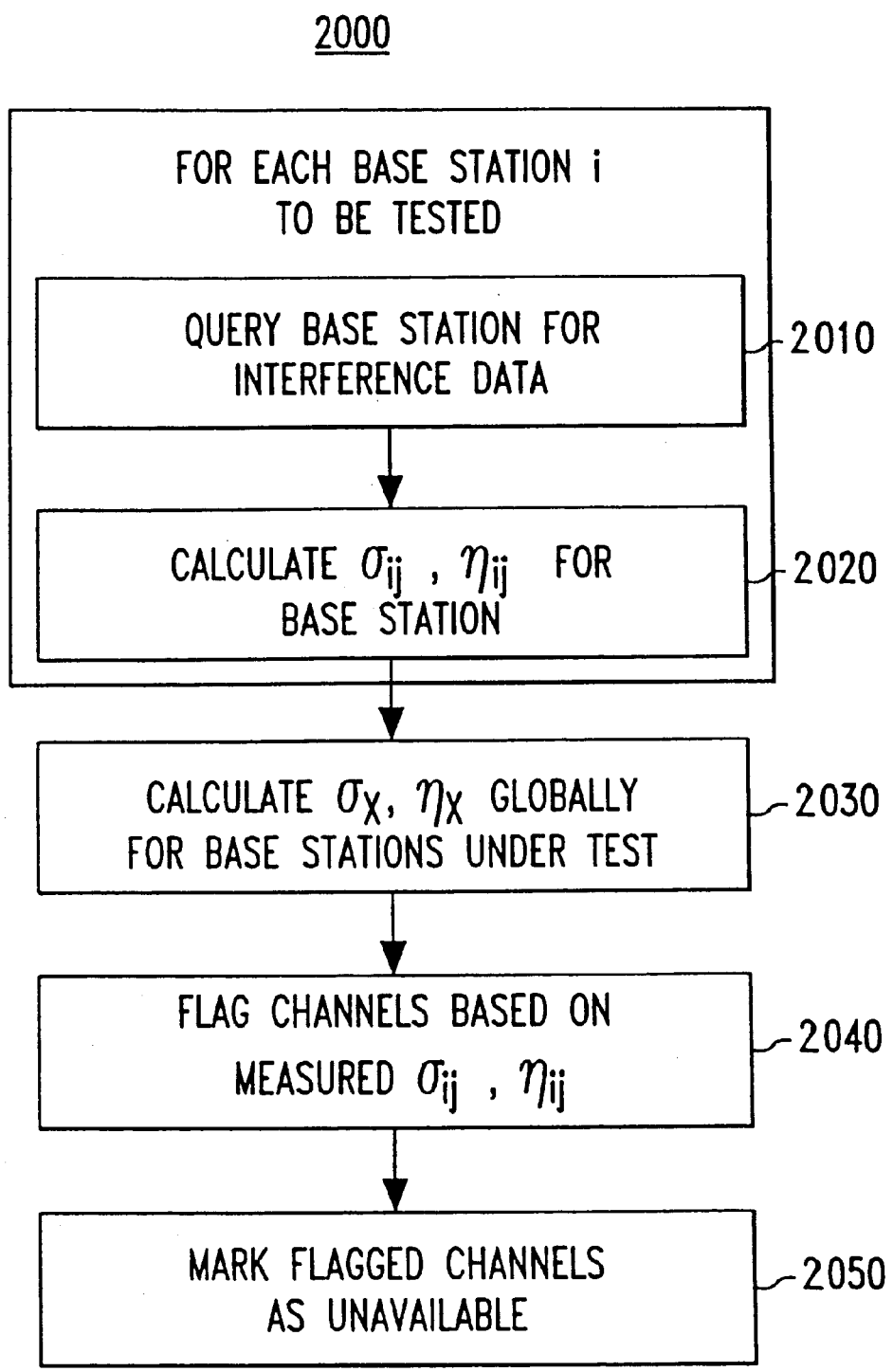
FIG. 5 illustrates a method of the present invention according to an embodiment.

FIG. 5 illustrates a method 2000 according to another embodiment of the present invention. According to this second embodiment, the noise floor measurements and the channel quality metric measurements may be reported per channel per base station rather than per base station as is disclosed with respect to FIG. 4. As with the method of FIG. 4, the method 2000 of FIG. 5 may be performed by a switching center 110 or a network manager 180 of the system 100.

According to the method of FIG. 5, the method 2000 queries the base station for the noise floor measurements of each channel and for the channel quality metric measurements at the base station (Step 2010). The base station will respond with interference measurements for each idle channel. From the response, the method 2000 calculates the $\sigma_{ij}$ for each channel j of the base station i. The base station also calculates $\eta_i$ for the base station i (Step 2020). Steps 2010–2020 may be repeated for as many base stations of the system as are to be tested.

Thereafter, the method calculates an aggregate $\sigma_x$ and $\eta_x$ for all of the base stations being tested (Step 2030). The method 2000 marks channels for diagnostic review based upon their $\sigma_{ij}$ and the $\eta_i$ of the base station i (Step 2040). Optionally, the method may cause a marked channel to be unavailable until the interference figures for the channel abates (Step 2050). If a channel that had been marked during a previous iteration of the method 2000 is not marked again in a current iteration, the channel may be made available.

The method 2000 of FIG. 5 is illustrated as including calculations of both noise floor distributions and channel quality metric distributions. Of course, the method 2000 could be operated based solely upon noise floor distributions in accordance with the embodiment illustrated in FIG. 4.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A method of identifying interference events at a receiver of a wireless communication system, comprising:
   querying the receiver for measured noise floor data,
   calculating, from the measured noise floor data, a probability distribution of the noise floor,
   determining a threshold based on a larger set of receivers, and
   identifying an interference event if the calculated probability distribution exceeds the threshold.

2. The method of claim 1, wherein the calculating step calculates a standard deviation of the measured noise floor data.

3. The method of claim 1, wherein the identifying step identifies an interference event if the standard deviation of the noise floor exceeds an expected value of interference energy plus a standard deviation of the expected value of the interference energy.

4. The method of claim 1, wherein the querying step includes querying an Ericsson model CMS 8800 base station for measured noise floor data stored in MCHA 1.

5. The method of claim 1, wherein the wherein the querying step includes querying an Ericsson model CMS 8800 base station for measured noise floor data stored in MCHA 21.

6. A diagnostic testing method for testing a plurality of base stations for interference, comprising:
   querying each of the plurality of base station subject to test for measured noise floor data,
   calculating, from the measured noise floor data of each base station, a probability distribution of noise floor at the base station,
   calculating, from the measured noise floor data, a probability distribution of interference energy of the plurality of base stations to determine a threshold based on the plurality of base stations, and
   identifying a base station as suffering interference based on a comparison of the noise floor probability distribution of the base station with the probability distribution of interference energy of the plurality of base stations.

7. The method of claim 6, wherein the calculating step calculates a standard deviation of the measured noise floor data.

8. The method of claim 6, wherein the identifying step identifies an interference event if the standard deviation of the noise floor exceeds an expected value of interference energy plus a standard deviation of the expected value of the interference energy.

9. The method of claim 6, wherein the querying step includes querying an Ericsson model CMS 8800 base station for measured noise floor data stored in MCHA 1.

10. The method of claim 6, wherein the querying step includes querying an Ericsson model CMS 8800 base station for measured noise floor data stored in MCHA 21.

11. A method of identifying interfered channels in a wireless communication system having a plurality of base stations, comprising:
   (i) querying each of the plurality of base stations for measured noise floor data of each idle channel at the base station,
   (ii) calculating, for each idle channel of each base station, a probability distribution of the noise floor of the channel,
   (iii) calculating, from the measured noise floor data, a probability distribution of interference energy for the plurality of base stations subject to test to determine a threshold based on the set of base stations, and
   (iv) identifying a channel as suffering interference based on a comparison of the channel's noise floor probability distribution with the probability distribution of interference energy for the plurality of base stations.

12. The method of claim 11, wherein step (ii) calculates a standard deviation of the measured noise floor data.

13. The method of claim 11, wherein the identifying step identifies an interference event if the standard deviation of the noise floor exceeds an expected value of interference energy plus a standard deviation of the expected value of the interference energy.

14. The method of claim 11, wherein the querying step includes querying an Ericsson model CMS 8800 base station for measured noise floor data stored in MCHA 1.

15. The method of claim 11, wherein the wherein the querying step includes querying an Ericsson model CMS 8800 base station for measured noise floor data stored in MCHA 21.

16. A method of identifying interfered channels in a wireless communication system having a plurality of base stations, comprising:
   querying each of the plurality of base station for measured noise floor data at the base station and for measured data representing channel quality metrics at the base station,
   calculating a probability distribution of the noise floor of each base station based upon the measured noise floor data of the respective base station,
   calculating a probability distribution of the channel quality data of each base station based upon the measured channel quality metrics,
   calculating a probability distribution of interference energy for the plurality of base stations subject to test,
   calculating a probability distribution of channel quality metrics for plurality of base stations subject to test to determine a threshold, and identifying a base station as suffering interference based on a comparison of the base station's noise floor probability distribution with the probability distribution of interference energy and a comparison of the base station's channel quality probability distribution with the channel quality probability distribution for the plurality of base stations.

17. The method of claim 16, wherein the first calculating step calculates a standard deviation of the measured noise floor data.

18. The method of claim 16, wherein the channel quality metric data is carrier to interference ratio of active channels.

19. The method of claim 16, wherein the channel quality metric data is bit error rates of active channels.

20. The method of claim 16, wherein the querying step includes querying an Ericsson model CMS 8800 base station for measured noise floor data stored in MCHA 1.

21. The method of claim 16, wherein the wherein the querying step includes querying an Ericsson model CMS 8800 base station for measured noise floor data stored in MCHA 21.

22. The method of claim 16, wherein the querying step includes querying an Ericsson model CMS 8800 base station for carrier to interference ratio data stored in MCHA 7.

23. The method of claim 16, wherein the querying step includes querying an Ericsson model CMS 8800 base station for bit error rate data stored in MCHA 26.

* * * * *